United States Patent
Bruland et al.

(10) Patent No.: US 8,278,595 B2
(45) Date of Patent: Oct. 2, 2012

(54) USE OF PREDICTIVE PULSE TRIGGERING TO IMPROVE ACCURACY IN LINK PROCESSING

(75) Inventors: Kelly Bruland, Portland, OR (US); Clint Vandergiessen, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 1154 days.

(21) Appl. No.: 11/687,578

(22) Filed: Mar. 16, 2007

(65) Prior Publication Data
US 2008/0223837 A1 Sep. 18, 2008

(51) Int. Cl.
*B23K 26/02* (2006.01)

(52) U.S. Cl. ......... 219/121.78; 219/121.62; 219/121.82; 219/121.83

(58) Field of Classification Search ............. 219/121.69, 219/121.72, 121.85, 121.68, 121.67, 121.62, 219/121.82, 121.83, 121.78; 438/130, 129; 700/166
See application file for complete search history.

(56) References Cited

U.S. PATENT DOCUMENTS

| | | | | |
|---|---|---|---|---|
| 6,144,118 A * | 11/2000 | Cahill et al. | | 310/12.06 |
| 6,313,434 B1 * | 11/2001 | Patterson et al. | | 219/121.69 |
| 6,339,604 B1 | 1/2002 | Smart et al. | | |
| 6,662,063 B2 * | 12/2003 | Hunter et al. | | 700/100 |
| 6,816,294 B2 * | 11/2004 | Unrath et al. | | 359/225.1 |
| 6,875,951 B2 * | 4/2005 | Sakamoto et al. | | 219/121.73 |
| 6,951,995 B2 * | 10/2005 | Couch et al. | | 219/121.67 |
| 2003/0116726 A1 * | 6/2003 | Hunter et al. | | 250/559.38 |
| 2003/0205563 A1 * | 11/2003 | Hunter et al. | | 219/121.75 |
| 2004/0134896 A1 * | 7/2004 | Gu et al. | | 219/121.69 |
| 2005/0281102 A1 * | 12/2005 | Bruland | | 365/200 |
| 2005/0282319 A1 * | 12/2005 | Bruland et al. | | 438/166 |
| 2006/0001543 A1 * | 1/2006 | Raskar et al. | | 340/572.1 |
| 2008/0094640 A1 * | 4/2008 | Cordingley et al. | | 356/614 |

FOREIGN PATENT DOCUMENTS

JP 03012975 A 1/1991
JP 08039721 A 2/1996

OTHER PUBLICATIONS

International Search Report and Written Opinion, International Application No. PCT/US2008/056854, mailed Jul. 9, 2008, 9 pages.
International Preliminary Report on Patentability, International Application No. PCT/US2008/056854, mailed Oct. 1, 2009, 5 pages.

* cited by examiner

*Primary Examiner* — Henry Yuen
*Assistant Examiner* — John Wasaff
(74) *Attorney, Agent, or Firm* — Stoel Rives LLP

(57) ABSTRACT

A predictive pulse triggering (PPT) method enables precise triggering of a laser beam in a link-processing system. The PPT method entails triggering the laser beam based on estimated relative motion parameters of the target and laser beam axis. The PPT method allows for a six-fold improvement in laser positioning accuracy over the conventional, entirely measurement-based method.

14 Claims, 5 Drawing Sheets

USE OF PREDICTIVE PULSE TRIGGERING TO IMPROVE ACCURACY IN LINK PROCESSING

COPYRIGHT NOTICE

© 2007 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

The present disclosure concerns pulsed laser technology used to process target specimens.

BACKGROUND INFORMATION

Integrated circuits, especially those used in computer memory arrays, are often designed in repetitive patterns, employing a unit cell duplicated over a large area of a semiconductor chip. Manufacturing yields for such dense circuitry tend to be low, because there is a greater probability that particles or other defects will coincide with electrically active devices or interconnecting wires, rendering them inoperable. One way to solve this problem entails building in redundant cells that can be substituted for failed cells discovered during electrical testing. A laser beam can accomplish this substitution step by severing certain electrical connections, while leaving others intact.

This error correction process is most efficiently executed at the wafer level, prior to dividing a wafer into individual chips. In a typical memory repair system the full wafer is transported on a robotically controlled stage beneath a laser optics assembly, which is programmed to trigger a laser pulse when the laser beam axis aligns with the desired connection point, or link. The velocity of the laser beam axis on the wafer relative to the link (also known as the link run velocity) and the accuracy of the laser beam triggering system define the quality and throughput of such link processing platforms.

At the present time, laser repair systems are capable of processing 100,000 links per second, at link run velocities up to 210 mm/sec, on devices spaced approximately 2 microns apart. Lasers suitable for memory repair are presently available with pulse repetition frequencies (PRFs) up to 150 kHz, or 150,000 pulses per second. Laser advances continue to increase the pulse repetition frequency, and lasers with several hundred kHz PRF are anticipated. Electro Scientific Industries, Inc., the assignee of this patent application, offers a Model 9850 dual beam link processing system that can double the laser PRF in a particular operational mode. It is desirable to process link runs at a velocity that is the product of the laser PRF and the link pitch. When this velocity exceeds the maximum capability of the system, the link run must be performed at a slower speed. Thus, laser beam pulses can be triggered at a much faster rate than the speed at which the laser beam axis can advance from one target to the next. This difference affords an opportunity to increase the link run velocity considerably.

SUMMARY OF THE DISCLOSURE

The present disclosure describes a "Predictive Pulse Triggering" ("PPT") method, which enables an improvement in system accuracy when triggering a laser beam in a link processing system. The PPT method enables, in a preferred embodiment, laser pulse triggering "on the fly," while the stage supporting a wafer is in motion, for example, at high constant velocity. The PPT method entails estimating link and laser beam axis positions, and triggering the laser beam based on this estimate. Metrology sources providing position indications of the wafer-supporting stage include interferometers, optical encoders, and many other sensor varieties.

Current state-of-the-art systems for triggering the generation of a laser pulse based upon measuring and communicating the wafer support stage position are characterized by an error magnitude more than ten times greater than that characterized by use of predicted parameters. Errors in triggering a laser beam using measured parameters increase linearly with link run velocity, i.e., as the speed of a laser beam axis increases, the ability to accurately measure its position and trigger the generation of a laser pulse to target a desired link decreases. The degree of system error also depends on the measurement sampling frequency in that a higher sampling rate (i.e., more measurements per unit time) is more accurate. In contrast, error in triggering a laser beam using the PPT method depends primarily on the accuracy of estimates. These estimates can be based upon multiple measurements of stage position at different times, link run velocity, and other data. They can be considerably more accurate than individual sensor measurements, and they can be produced at a higher sampling rate than available sensors.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
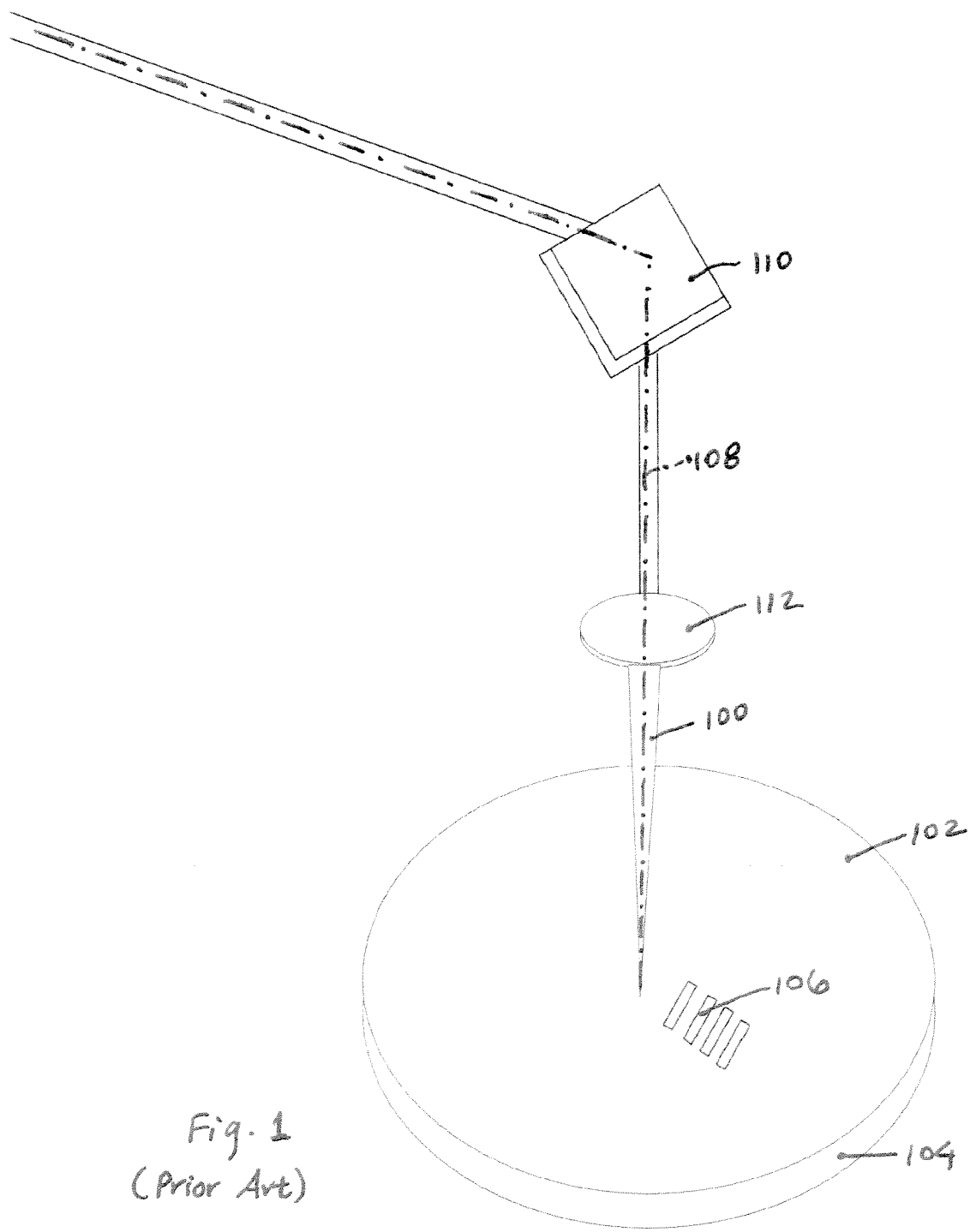
FIG. 1 is a diagram of a laser beam directed toward the surface of a target specimen.

FIG. 1 depicts a pulsed laser beam 100 directed along a propagation axis toward the surface of a semiconductor wafer 102. Wafer 102 is positioned on a moveable support or stage 104. Features on the wafer surface include rows of target structures 106 to be processed by a laser beam 100. The location of a beam propagation axis 108 of laser beam 100 may be shifted relative to target structures 106 by controlling optical components such as mirrors 110 and lenses 112 capable of redirecting beam propagation axis 108, as well as through motion of support 104.

Figure 2:
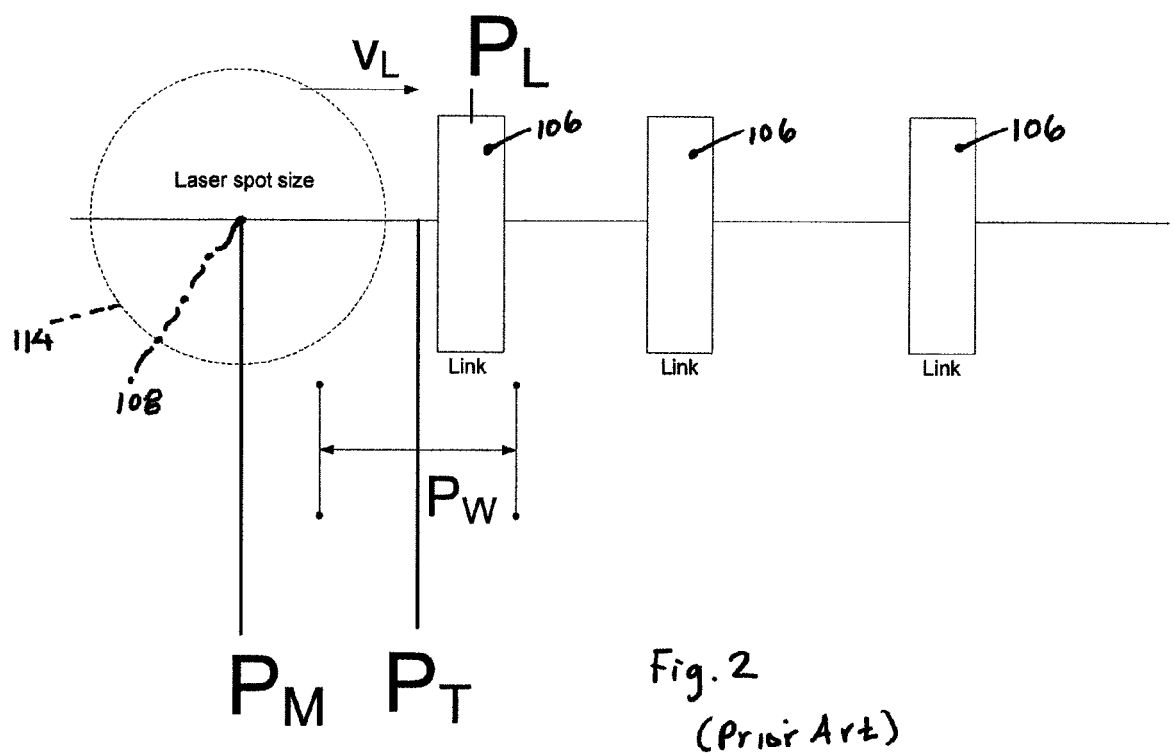
FIG. 2 is a diagram of a laser beam spot moving at link run velocity, $V_L$, along a row of links to be severed, demonstrating a position-based criterion for triggering a laser beam to sever a link.
Figure 3:
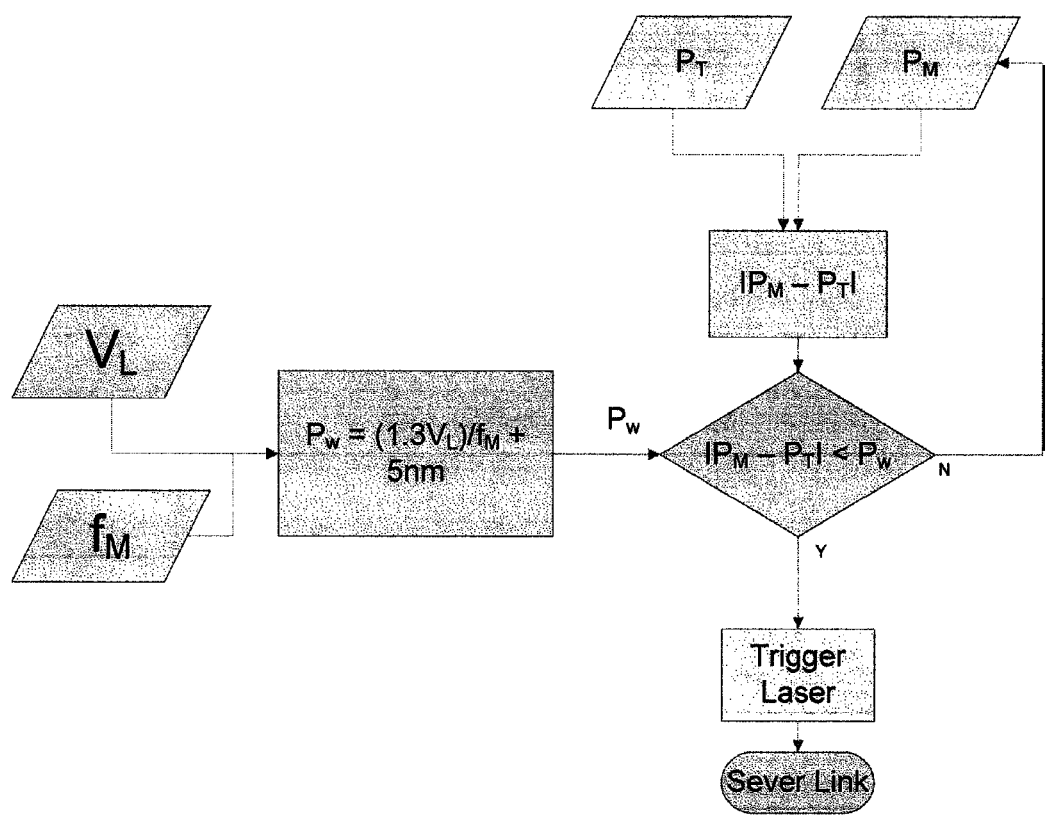
FIG. 3 is a flowchart showing an overview of a conventional laser pulse triggering method that is entirely measurement-based.

The comparative advantage of the PPT method over a standard triggering methodology based on measured position data is described below with reference to FIGS. 2 and 3 in connection with triggering the generation of a laser beam pulse in a link processing system. FIG. 2 depicts laser beam axis 108 moving along a row of target structures or links 106, in which some of links 106 are specified to be severed. Beam axis 108 defines the center of a laser beam spot 114 on wafer 102. FIG. 3 is a flowchart that sets forth the process steps carried out in accordance with the conventional measurement-based laser pulse triggering method. With reference to FIGS. 2 and 3, an interferometer, such as ZMI 2001, available from Zygo Corporation, Middlefield, Conn. (not shown), measures the position, $P_M$, of beam axis 108 relative to wafer 102 by measuring the location of support 104 at periodic time-displaced intervals. Beam axis position $P_M$ is then compared with a desired trigger position, $P_T$. The remaining target travel distance $|P_M-P_T|$ is then evaluated to determine whether laser beam spot 114 is located within an acceptable position trigger window, $P_w$, centered around link trigger position $P_T$. If this condition is not satisfied, laser beam axis 108 is located too far from the target to activate laser beam 100. Therefore, stage 104 continues to move the position $P_M$ of laser beam axis 108 relative to target link 106, at a link run velocity, $V_L$, and the measurement of $P_M$ is repeated. Whenever the travel distance $|P_M-P_T|$ lies within position window $P_w$, a laser beam pulse 100 is triggered, and the link 106 is severed.

The trigger position $P_T$ is determined such that generating a laser pulse when axis position $P_M$ coincides with trigger position $P_T$ results in the delivery of a laser beam spot 114 precisely on a specified target link 106 at position $P_L$. Typically the trigger position is before the link position to allow time for the laser power supply and laser head to generate the pulse and for the light to propagate through the optics system. At a link run velocity $V_L$ with a predetermined pulse generation and propagation time, $T_{prop}$, trigger position $P_T=P_L-V_L T_{prop}$. However, the trigger position may be at the link position.

Figure 4:
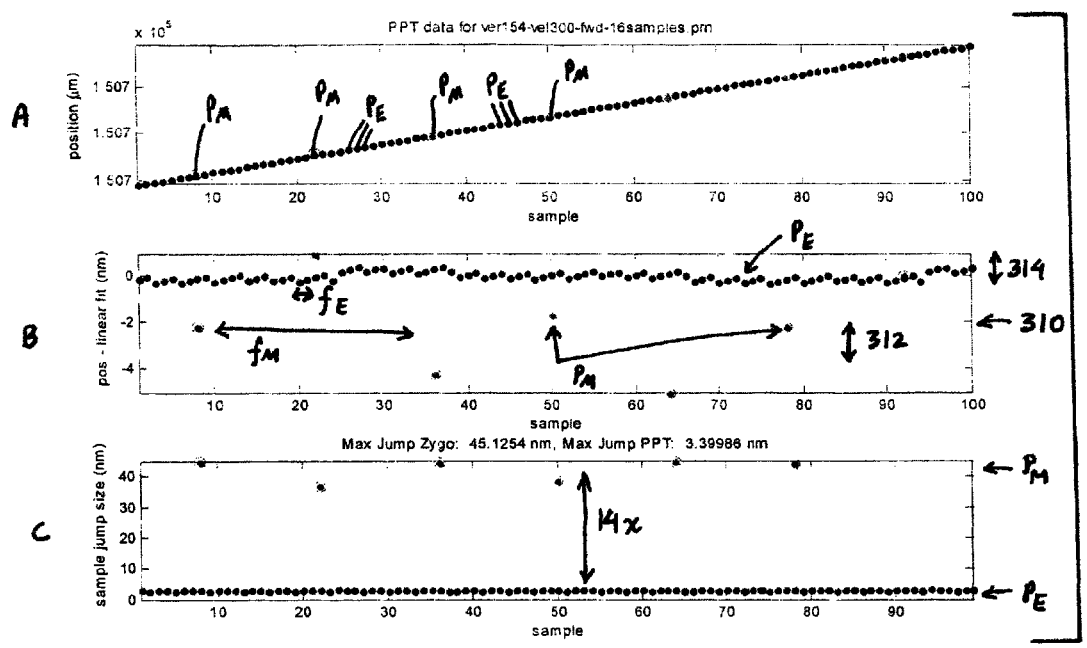
FIG. 4 is a set of graphs comparing measured position data with extrapolated position data to demonstrate the smoothing effect of the PPT method.

The standard triggering method becomes problematic at high link run velocities because the accuracy and sampling rate of position measurements is insufficient to provide the desired degree of precision in triggering of laser beam 100. The PPT method, however, affords the benefits of an increased position measurement sampling rate by estimating intermediate positions, instead of actually conducting more frequent position measurements. The PPT method is described below with reference to FIGS. 4 and 5. In FIG. 4, graph A, circled gray dots represent measured positions $P_M$ of the moveable wafer support 104 taken at a sampling rate of $f_M=7.1$ MHz as laser beam axis 108 moves along a row of target links 106 to be severed. Extrapolated positions $P_E$ of the same stage calculated at $f_E=100$ MHz are shown as black dots. There are 100/7.1=14 extrapolated positions $P_E$ within each measurement interval. A close-up comparison can be made by subtracting a fit line from the position data shown in FIG. 4, graph A, where resulting differential position data 310 are shown in FIG. 4, graph B. FIG. 4, graph B indicates an elevated noise level 312 in the measured position data set, compared with a higher level of precision 314 obtained by extrapolation.

FIG. 4, graph C demonstrates the effect on the trigger window of estimating intermediate positions using the PPT method. Whenever wafer 102 moves at high velocity, the position trigger window $P_w$ for successfully triggering laser beam 100 increases in width. Moreover, knowing when laser beam axis 108 is situated within position window $P_w$ depends on frequent feedback of laser beam axis positions. Therefore, the allowable choices for position trigger window $P_w$ are dictated by the measurement sampling rate, $f_M$. The sampling rate of extrapolated position data, $f_E$, in the example is approximately 14 times greater than the measurements sampling rate $f_M$. The trigger window, $P_{win}$, when using the PPT method, therefore, may be 14 times narrower than the trigger window $P_w$ without the benefit of the PPT method, thereby allowing for much higher precision in triggering.

Figure 5:
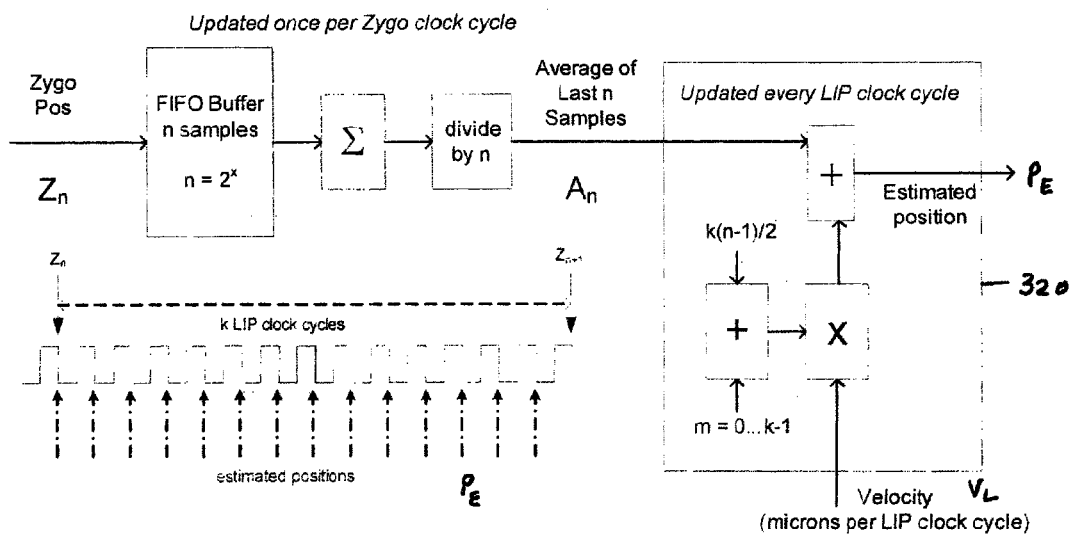
FIG. 5 is a block diagram detailing steps of an estimation algorithm of the PPT method.
Figure 6:
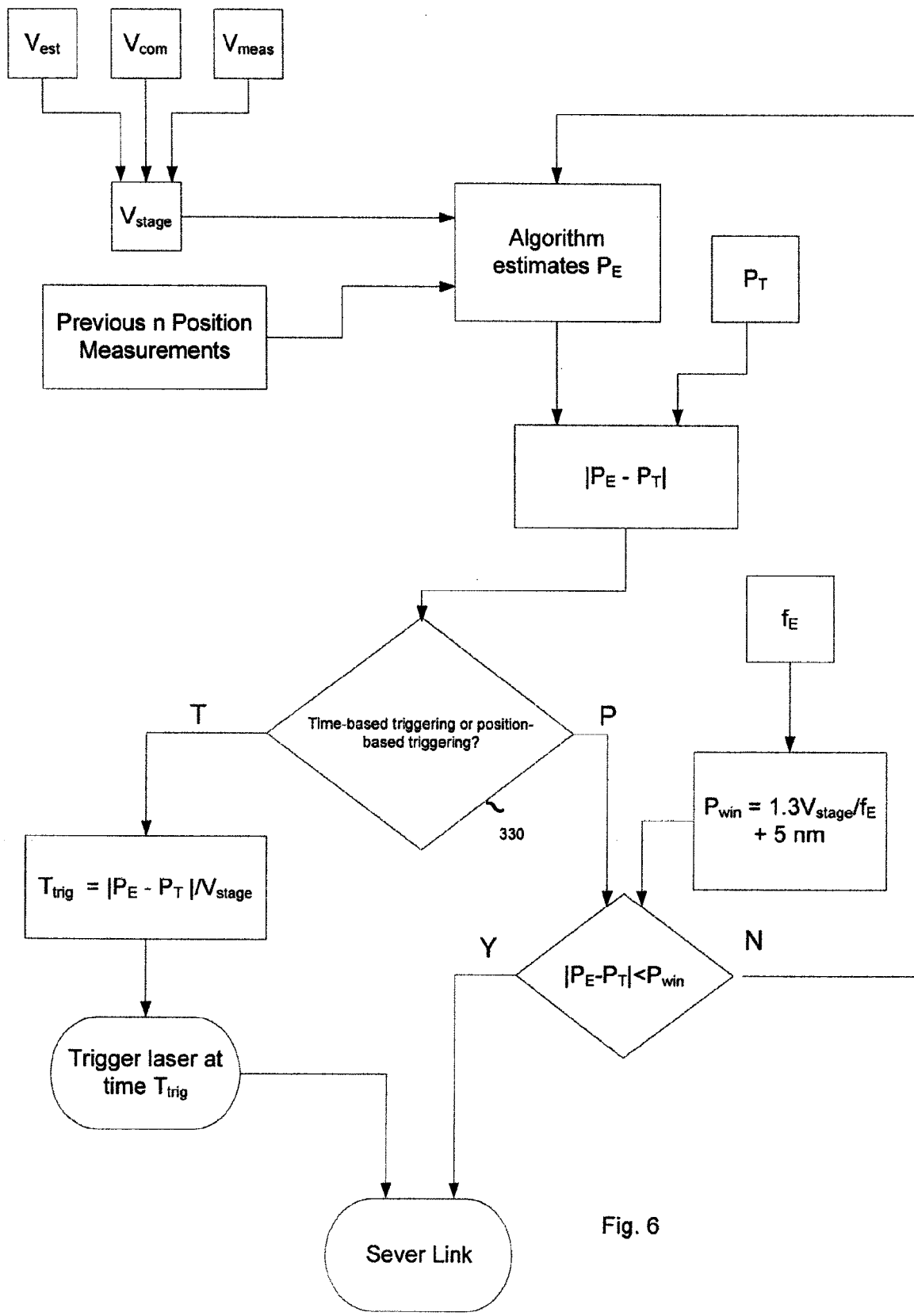
FIG. 6 is a flowchart showing an overview of the PPT laser beam triggering method based on a combination of motion parameter measurement and estimation.

FIG. 5 is a block diagram that is useful in describing the algorithm used to extrapolate positions $P_E$ based on instantaneous velocity measurements. FIG. 6 is a flowchart that sets forth the process steps carried out in accordance with the algorithm implemented by operation of the subsystem depicted in FIG. 5. In FIG. 5, "Zygo positions $Z_n$," refer to a sequence of wafer support position measurements given by a Zygo interferometer. An average value $A_n$ of measured wafer support position data $Z_n$ and the instantaneous link run velocity $V_L$ are inputs to a position calculation module 320, which simply advances the extrapolated laser beam position $P_Z$ according to the standard equation of motion, $x_{new}=x_{old}+v_L t$, where t represents the elapsed time since the last position measurement. Typically, PPT position estimates are produced at a rate $f_e=100$ MHz, corresponding to a period, $T_e$, of 10 nanoseconds.

Sources of errors stemming from practice of the conventional methodology are understood as follows. First, position window $P_w$ is formally defined as the maximum distance traveled in one sample period, $T_M$, plus an equipment-based constant, $P_F=5$ nm. The maximum stage velocity is generously assumed to be 1.3 times the desired link run velocity, $V_L$. Thus, position window $P_w=1.3V_L T_M+P_F$, where the sample period $T_M$ is the inverse of the sensor sampling rate $f_M$. For example, if sensor sampling rate $f_M=6.7$ MHz and link run velocity $V_L=200$ mm/sec, the estimated position window $P_w=44$ nm. Because the window is centered about the trigger position, this value represents twice the worst case error of 22 nm in positioning laser beam 100, which is uniquely determined by sensor sampling rate $f_M$ and the link run velocity $V_L$ at which laser beam axis 108 traverses wafer 102.

With reference to FIG. 6, the PPT method utilizes, for the approximate stage velocity $V_{stage}$, either a measured value $V_{means}$, an estimate $V_{est}$, or simply a velocity set point $V_{com}$ ("commanded velocity"). As indicated by decision block 330, triggering a laser pulse can then be accomplished in one of two ways—time-based triggering or position-based triggering. As indicated by the "P" output of decision block 330, a position-based triggering embodiment compares the remaining travel distance $|P_E-P_T|$ to a position window, $P_{win}$, where $P_E$ represents the extrapolated position and $P_{win}$ represents the narrower position window resulting from the higher PPT sampling rate $f_E$. As indicated by the "T" output of decision block 330, a time-based triggering embodiment calculates a laser trigger time, $T_{trig}$, as travel distance $|P_E-P_T|$ divided by approximate stage velocity, $V_{stage}$.

The trigger window using the PPT method, $P_{win}$, can be calculated by substituting PPT parameters into the previously introduced equation $P_{win}=1.3V_L T_e+P_F$. For the same 200 mm/second link run velocity and the frequency of estimates being 100 MHz, the trigger window width is reduced to just 7.6 microns, and the worst caser error is only 3.8 microns. Comparing this worst case position error with the corresponding worst case position error of 22 nm calculated above using the conventional methodology, shows more than a six-fold improvement in positioning accuracy when using the PPT method over the conventional method.

Alternative embodiments employ various position and velocity measuring devices as alternatives to an interferometer, such as, for example, optical or interferometric encoders; temperature, pressure, or strain gauge sensors; ultrasound, autocollimators, optical sensors (quad cells, PSDs, CCD vision sensors), and electronic sensors (capacitive, inductive, LVDT). In addition, various alternative data processing schemes for producing estimates include a link processor board (LIP) that uses FPGAs for computation and a real time computer (RTC) employing digital signal processors. Applicable signal processing techniques include neural networks, signal filtering and averaging, Kalman filtering, and fuzzy logic.

It will be obvious to those having skill in the art that many changes may be made to the details of the above-described embodiments without departing from the underlying principles of the invention. The scope of the present invention should, therefore, be determined only by the following claims.

The invention claimed is:

1. A method of triggering emission of laser pulses directed for processing a target specimen, the laser pulses propagating along a beam axis and the target specimen mounted to a support, the beam axis and support moving relative to each other at a velocity to process the target specimen by incidence of the laser pulses at specified target specimen locations, and the specified target specimen locations being associated with laser pulse trigger positions on the target specimen, comprising:

performing, at multiple time-displaced measurement intervals corresponding to a measurements sampling rate, measurements of relative positions between the beam axis and the support to acquire measured relative position data;

estimating relative position data for different times within each of the multiple time-displaced measurement intervals, the estimated relative position data corresponding to extrapolated relative positions between the beam axis and the support at the different times corresponding to an extrapolated position data sampling rate that is substantially greater than the measurements sampling rate, and, for each of the multiple time-displaced measurement intervals, the extrapolated relative positions being derived from values of the measured relative position data, velocity, and time elapsed within the time-displaced measurement interval;

comparing the estimated relative position data with the laser pulse trigger positions associated with the specified target specimen locations to determine occurrence of the beam axis within a trigger window associated with a selected one of the specified target specimen locations;

establishing the trigger window in accordance with a ratio of the measurements sampling rate to the extrapolated position data sampling rate; and in response to the determination of the occurrence of the beam axis within the trigger window, triggering emission of a laser pulse to process the target specimen at the selected one of the specified target specimen locations.

2. The method of claim 1, in which the velocity includes a measured velocity value corresponding to one of the relative positions between the beam axis and the support.

3. The method of claim 1, in which the velocity includes a commanded set-point velocity of the relative movement of the beam axis and the support.

4. The method of claim 1, in which the velocity includes an estimate based on the relative movement of the beam axis and the support.

5. The method of claim 1, in which the measurements of relative positions performed at multiple time-displaced measurement intervals are provided by an interferometer.

6. The method of claim 1, in which the measurements of relative positions performed at multiple time-displaced measurement intervals are provided by an encoder.

7. The method of claim 1, in which the estimating of relative position data is performed with use of a Kalman filter.

8. The method of claim 1, in which the estimating of relative position data is performed by link processing (LIP) circuitry.

9. The method of claim 1, in which the estimating of relative position data corresponding to extrapolated relative positions comprises using the velocity to compute incremental position values in smaller time intervals than the multiple time-displaced measurement intervals.

10. The method of claim 1, in which the values of the relative position data from which the extrapolated relative positions are derived correspond to a number of previous multiple time-displaced measurement intervals.

11. The method of claim 1, in which the support includes a motion stage.

12. The method of claim 1, in which the target specimen includes a semiconductor wafer fabricated with electrically conducting link structures.

13. The method of claim 1, in which the trigger window represents a trigger time window, and in which the triggering of emission of a laser pulse takes place at a time within the trigger time window.

14. The method of claim 1, in which the trigger window represents a trigger position window, and in which the triggering of emission of a laser pulse takes place upon the occurrence of the beam axis within the trigger position window.

* * * * *